United States Patent
Toivonen et al.

(10) Patent No.: US 9,534,360 B2
(45) Date of Patent: Jan. 3, 2017

(54) LIQUID DISPENSER APPARATUS

(75) Inventors: Ari Toivonen, Eurajoki (FI); Jukka Alhola, Rauma (FI)

(73) Assignee: ORAS OY, Rauma (FI)

( * ) Notice: Subject to any disclaimer, the term of this patent is extended or adjusted under 35 U.S.C. 154(b) by 1205 days.

(21) Appl. No.: 12/800,971

(22) Filed: May 25, 2010

(65) Prior Publication Data

US 2011/0006075 A1   Jan. 13, 2011

(30) Foreign Application Priority Data

May 26, 2009   (FI) ..................................... 20095577

(51) Int. Cl.
| | | |
|---|---|---|
| B67B 7/00 | (2006.01) | |
| G01F 11/00 | (2006.01) | |
| B67D 1/00 | (2006.01) | |
| E03C 1/05 | (2006.01) | |
| G01S 17/02 | (2006.01) | |
| G01S 17/48 | (2006.01) | |

(52) U.S. Cl.
CPC .............. *E03C 1/057* (2013.01); *G01S 17/026* (2013.01); *G01S 17/48* (2013.01)

(58) Field of Classification Search
USPC ........ 222/1, 52, 63; 4/623; 250/341.7, 341.8
See application file for complete search history.

(56) References Cited

U.S. PATENT DOCUMENTS 2,237,193 A * 4/1941 Mobsby ......................... 250/350
4,207,466 A * 6/1980 Drage et al. ............... 250/338.1
4,984,314 A * 1/1991 Weigert ............................ 4/663
5,566,702 A   10/1996 Philipp
5,668,366 A   9/1997 Mauerhofer
(Continued)

FOREIGN PATENT DOCUMENTS

DE   31 00 773 A1   11/1981
DE   43 24 512 A1   1/1994
(Continued)

OTHER PUBLICATIONS

Search report issued Oct. 19, 2009 in connection with Finnish Application No. 20095577.
(Continued)

*Primary Examiner* — Paul R Durand
*Assistant Examiner* — Vishal Pancholi
(74) *Attorney, Agent, or Firm* — John P. White; Cooper & Dunham LLP

(57) ABSTRACT

An embodiment of the invention relates to an apparatus for dispensing liquid, which apparatus detects an object and controls the dispensing of liquid. The apparatus includes a first signal source which generates a first beam pulse and a second signal source which generates a second beam pulse and the propagation paths of the beam pulses intersect in relation to each other. The apparatus also includes a receiver which receives reflected parts of the first beam pulse and receives reflected parts of the second beam pulse, the parts reflected from the first and second beam pulses being reflected from the object which is located on the propagation path of the first and the second beam pulse. Furthermore, the system comprises a signal processing unit detects said object based on the parts reflected from the beam pulses and, based on this detection, controls the dispensing of liquid.

14 Claims, 7 Drawing Sheets

(56) References Cited

U.S. PATENT DOCUMENTS

| | | | | |
|---|---|---|---|---|
| 5,694,653 A | * | 12/1997 | Harald | 4/623 |
| 5,862,844 A | * | 1/1999 | Perrin | 141/351 |
| 6,067,673 A | * | 5/2000 | Paese et al. | 4/623 |
| 6,770,869 B2 | * | 8/2004 | Patterson et al. | 250/252.1 |
| 7,486,366 B2 | | 2/2009 | Kataoka et al. | |

FOREIGN PATENT DOCUMENTS

| | | |
|---|---|---|
| DE | 102 19 944 C1 | 12/2003 |
| DE | 10 2007 052700 A1 | 5/2009 |
| WO | WO 03/106772 A1 | 12/2003 |

OTHER PUBLICATIONS

Mar. 7, 2011 European Search report in connection with European Patent Application No. 10163770.0.

\* cited by examiner

LIQUID DISPENSER APPARATUS

FIELD OF INVENTION

The invention relates to an apparatus, a method and a computer program which are arranged to detect an object. The invention also relates to a water dispenser device which includes an apparatus according to the invention.

BACKGROUND

Detecting an object by means of light source measurement typically causes many problems, because different objects reflect light with different power intensity [$W/m^2$]. This is the result of different objects having a different reflection coefficient. In practice, variation can be detected by the human eye such that different objects display in different colours. When using light source measurement, the position of the object can be determined by means of the power intensity reflected by the object.

Many techniques exist by means of which the object can be detected even though its reflection coefficient is unknown when performing the measurement. One of the known techniques is position sensitive measurement which is also known by the term position sensitive device (PSD). Usually, the PSD device comprises a light signal source and a signal receiver. When said light source emits light signals and light rays meet the object, at least part of said light signals are reflected back and meet the surface of the PSD receiver. The receiver does not conduct electricity in usual conditions, but the reflected light rays include photons which can release carrier particles in the PSD receiver and induce several electric currents in the PSD receiver. By measuring the position of the induced electric currents in the PSD receiver, the position of the object can be determined.

By means of this method comparing the position of electric currents, the position of the object can be determined even though the reflection coefficient of the object is unknown. The PSD device comprises various details related to microelectronics. Furthermore, said apparatus requires several amplifiers. Due to these issues, PSDs are too expensive for use in all such applications in which the aim is to detect an object.

Another technique for detecting an object is known. This technique utilises a light source and at least two separate receivers which are on the same plane with said light source. Into connection with each receiver is arranged at least one amplifier. When said light source emits light and light rays meet the object, at least part of said light signals are reflected back and meet the surface of one receiver. The angle between the transmitted light signal and the reflected light signal varies depending on the position of the object in relation to the light source and this has an effect on which receiver receives the reflected light signal. In the case of the object having been in some other position, at least part of the light signals would also in this case be reflected back and the angle between the transmitted light signal and the reflected light signal would have been some other. Due to this, the reflected light signal would meet the surface of another receiver.

Either in this arrangement, it is not necessary to know the reflection coefficient of the object in order to determine the position of the object. However, a problem of this arrangement is that it requires several receivers and amplifiers arranged into connection with them and this incurs extra costs for component manufacturers. Furthermore, the amplifiers have to be set in a predetermined position in order to guarantee the operation of said system. Therefore, the device requires a lot of space.

An additional known technique for detecting an object is an apparatus which includes several signal sources for transmitting signals and at least one receiver arranged to receive signals. The propagation directions of signals provided by the signal sources are parallel in relation to each other. When said object is in the propagation direction of these signals, at least part of said signals are reflected in the receiver which receives said signals. A problem of this known arrangement is that the difference in the power intensity of received signals is small, because the propagation paths of the signals are parallel in relation to each other. Due to this, several amplifiers are required and this increases the manufacturing costs of this known technique.

SUMMARY

This invention relates to an apparatus, a method and a computer program which are applicable to dispensing liquid.

According to an aspect, this invention relates to an apparatus for dispensing liquid which apparatus is arranged to detect an object and to control the dispensing of liquid. Said apparatus includes a first signal source arranged to generate a first beam pulse and a second signal source arranged to generate a second beam pulse, and the propagation paths of said beam pulses intersect in relation to each other. Said apparatus also includes a receiver which is arranged to receive reflected parts of said first beam pulse and which is arranged to receive reflected parts of said second beam pulse, the parts reflected from said first and second beam pulses being reflected from said object which is located on the propagation path of the first and the second beam pulse. Furthermore, said system comprises a signal processing unit which is arranged to detect said object based on the parts reflected from said beam pulses received by said receiver and, based on this detection, arranged to control the dispensing of liquid.

According to another aspect, the invention relates to a water dispenser device which includes an apparatus according to the invention.

According to an aspect, the invention relates to a method for dispensing liquid which method is arranged to detect an object and to control the dispensing of liquid. Said method comprises generating a first beam pulse and generating a second beam pulse, and the propagation paths of said beam pulses intersect in relation to each other. Furthermore, said method includes receiving reflected parts from said first beam pulse and receiving reflected parts from said second beam pulse, the reflected parts of said first and second beam pulses having been reflected from said object which is located on the propagation path of the first and the second beam pulse. Said method also includes detecting said object, based on the received parts reflected from said beam pulses and, based on this detection, controlling the dispensing of liquid.

According to an aspect, the invention relates to a computer program which includes computer program means which are applicable to perform the steps of the method according to the invention when said computer program is run in a computer.

Some embodiments of the invention provide many advantages. For instance, the structure of an embodiment of the invention can be simpler and thus easier to manufacture. Another embodiment of the invention has lower manufacturing costs. A further embodiment of the invention is again very space-saving. E.g. such an embodiment in which all receivers and signal sources are installed on the same circuit board, which is also known as a printed circuit board, or at least on the same plane with each other. In an embodiment of the invention, at least two signal sources instead of one are used for detecting an object the reflection coefficient of which is unknown and, due to this, more accurate detection results are obtained.

BRIEF DESCRIPTION OF FIGURES

The invention can be understood more accurately based on the following description which is given as an example and which can be understood together with the accompanying drawings in which.

DETAILED DESCRIPTION OF EMBODIMENTS

Figure 1A:
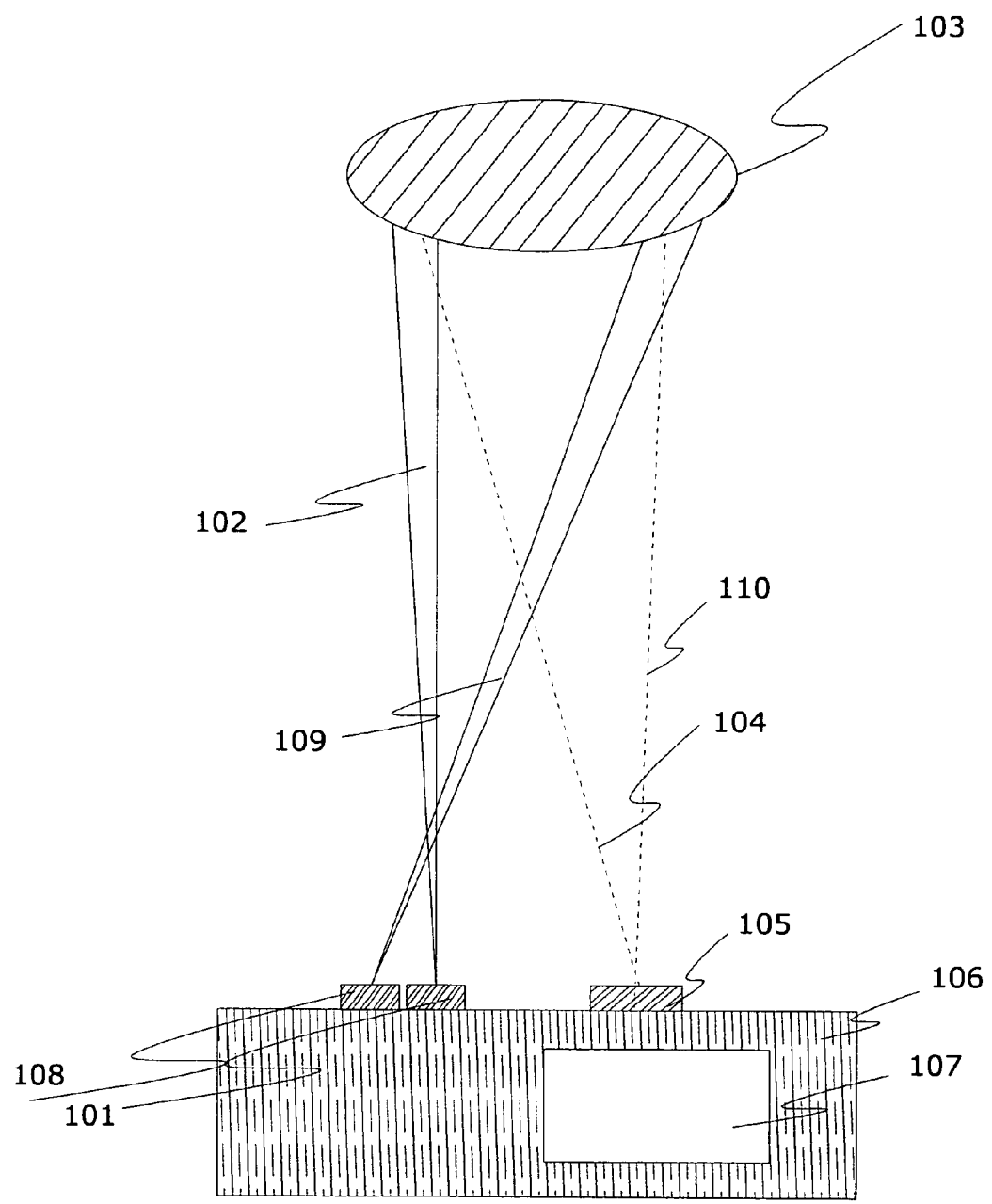
FIGS. 1A-1B illustrate an embodiment of the invention which includes two signal sources
Figure 1B:
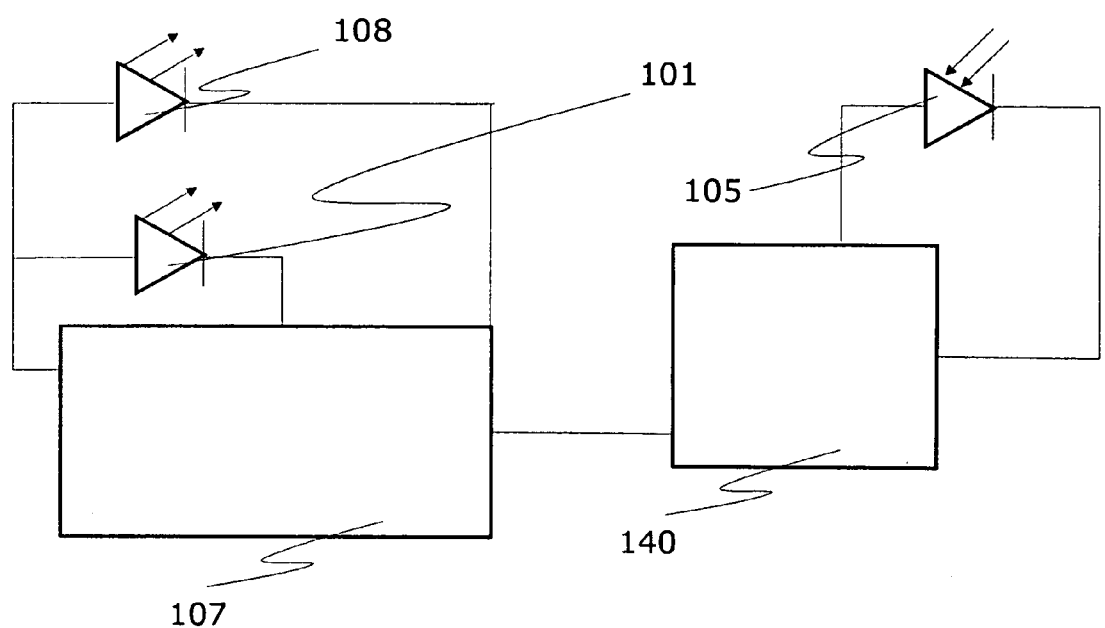

FIG. 1A shows an example of an embodiment of the invention. An example of a circuit diagram related to an apparatus 106 according to FIG. 1A is shown in FIG. 1B. First, the apparatus 106 is turned on by means of a switch. Then, a first signal source 101 transmits a first signal beam pulse 102. When an object 103 is located on the propagation path of the first beam pulse, at least parts of a beam pulse 104 are reflected from the object 103. According to an embodiment of the invention, the signal sources comprise any light source or equivalent which emits light visible or invisible to the human eye. The light source can e.g. be an infrared light emitting diode which emits infrared light.

The apparatus 106 shown in FIGS. 1A and 1B includes a receiver 105 which is arranged to receive reflected parts of the beam pulse 102 transmitted by the first signal source 101. In an embodiment of the invention, signals can be amplified before reception by means of an amplifier 140, as shown in FIG. 1B. In an embodiment of the invention, the receiver 105 can be e.g. a light-emitting diode (photodiode), a phototransistor or any other equivalent piece. After the reflected parts of the beam pulse have been received, they are digitalised by means of a processor A/D converter located on the circuit board. In an embodiment of the invention, a signal processing unit 107 can include a computer program which can control the processor. The SPU (signal processing unit) 107 compares the power intensity value 104 of the reflected parts of the beam pulse of the first signal to at least one reference value in its memory. This comparison yields information on if the object 103 is at a detection distance.

In the case of the power intensity value 104 of the received reflected parts of the beam pulse of the first signal being smaller than said reference value in the memory, the object 103 is not at the detection or identification distance and the apparatus continues to transmit the first beam pulses 102 at regular intervals until the reflected beam pulses, which originate from the first signal source 101, exceed said reference value or the apparatus is turned off.

In such a case that the power level 104 of the reflected beam pulse parts generated by the first signal source 101 exceeds the reference value, it is possible that the object 103 is at the detection distance.

Then, a second signal source 108 transmits a second signal beam pulse 109. Both the first and the second beam pulse can be transmitted e.g. 5-10 times per second. In an embodiment of the invention, the first signal source 101 and the second signal source 108 transmit beam pulses alternately in terms of time. Alternation between the first and the second beam pulse can be provided e.g. by means of an oscillator, e.g. an LC circuit is applicable to this as well as a crystal oscillator. When the beam pulses are caused to alternate, it is easier for the receiver in an embodiment to distinguish the beam pulse 102 of the first signal source from the beam pulse 109 of the second signal source. In another embodiment of the invention, the beam pulse 102 of the first signal source is distinguished from the beam pulse 109 of the second signal source by the angle between reflected beam pulses 110 and 104 or by the distance measured on the surface of the receiver.

The signal sources can be adjusted such that graphs describing their power level are convergent in a specific time unit. Furthermore, in an embodiment of the invention, the power-level amplitudes of the first signal source and/or the second signal source can be divergent in relation to each other in a specific time unit.

The propagation paths of the first and the second signal beam pulse intersect in relation to each other as seen in FIG. 1A. In an embodiment of the invention, the orientation of the signal beam pulses in such a way that the beams intersect in relation to each other can be done e.g. by means of at least one optical element, such as a lens, a mirror or a prism. In an embodiment of the invention, the tilt angle between the first signal beam pulse 101 and the second signal beam pulse 109 is adjustable. In another embodiment of the invention, the second signal source is installed in such a tilt angle that the beams have been caused to intersect in relation to each other. FIG. 1A illustrates that the parts 110 of the second beam pulse are also reflected from the object 103 which is located on the propagation path of the first and the second beam pulse. The object 103 can be e.g. a human body part such as a hand or a thing such as a water glass.

The receiver 105 receives the reflected parts 110 of the second beam pulse. The received reflected parts of the second beam pulse 110 are digitalised by means of the A/D converter in an equivalent way as the received parts of the first beam pulse 104 were digitalised. The SPU (signal processing unit) 107 compares the power level of the reflected parts 104 of the first beam pulse to the power level of the reflected parts 110 of the second beam pulse by calculating their proportion.

Operation which includes e.g. transmitting signal beams, receiving the reflected parts of the beam pulse and digitalising the reflected parts of the first beam pulse and digitalising the reflected parts of the second beam pulse can be repeated several times in an embodiment of the invention. If the operation is repeated several times, the SPU (signal processing unit) 107 compares the power level of the reflected parts 104 of the first beam pulse to the power level of the reflected parts 110 of the second beam pulse by calculating their proportion in a specific time unit. Then, the SPU compares said average power-level proportion in the time period to a reference value in its memory. Based on this comparison, the distance of the object 103 can be determined and/or the object 103 can be detected. In the case of having determined the distance of the object 103 and/or having detected the object 103, the processor performs operations predetermined for it. The predetermined operation can be e.g. switching a water tap on.

FIG. 1A also depicts another embodiment of the invention. First, the apparatus is turned on by means of the switch. The first signal source 101 transmits the first signal beam pulse 102 and, then, the second signal source 108 transmits the second signal beam pulse 109.

Even though the embodiments of FIGS. 1A and 1B show only one receiver 105, in another embodiment of the invention, there can be more than one receiver and they can be on the same circuit board with each other and/or on the same plane with the signal sources. The circuit board is also known as a printed circuit board. In a further embodiment of the invention, the receivers and the signal sources are not located on the same circuit board with each other. In an embodiment of the invention, at least one of the components is located on a different plane than the other components. FIG. 1A shows that the propagation paths of the beam pulses of the first signal source 101 and the second signal source 108 intersect each other.

When the object 103 is located on the propagation path of the beam pulses of the signal sources, at least part of the beam pulses are reflected from the object 103. The receiver 105 receives the reflected parts 104 of the first beam pulse and the reflected parts 110 of the second beam pulse. When the reflected parts of the beam pulse have been received, the reflected parts 104 of the first beam pulse and the reflected parts 110 of the second beam pulse are digitalised by means of the processor A/D converter located on the circuit board.

According to an embodiment of the invention, the SPU (signal processing unit) 107 compares the power level of the reflected parts 104 of the first beam pulse to the power level of the reflected parts 110 of the second beam pulse by calculating their proportion. Then, the SPU compares the power-level proportion to a reference value in its memory. Based on these average power-level values, the object can be detected. As a result of having detected the object, the processor 107 performs predetermined operations, such as switches the shower on.

Figure 2:
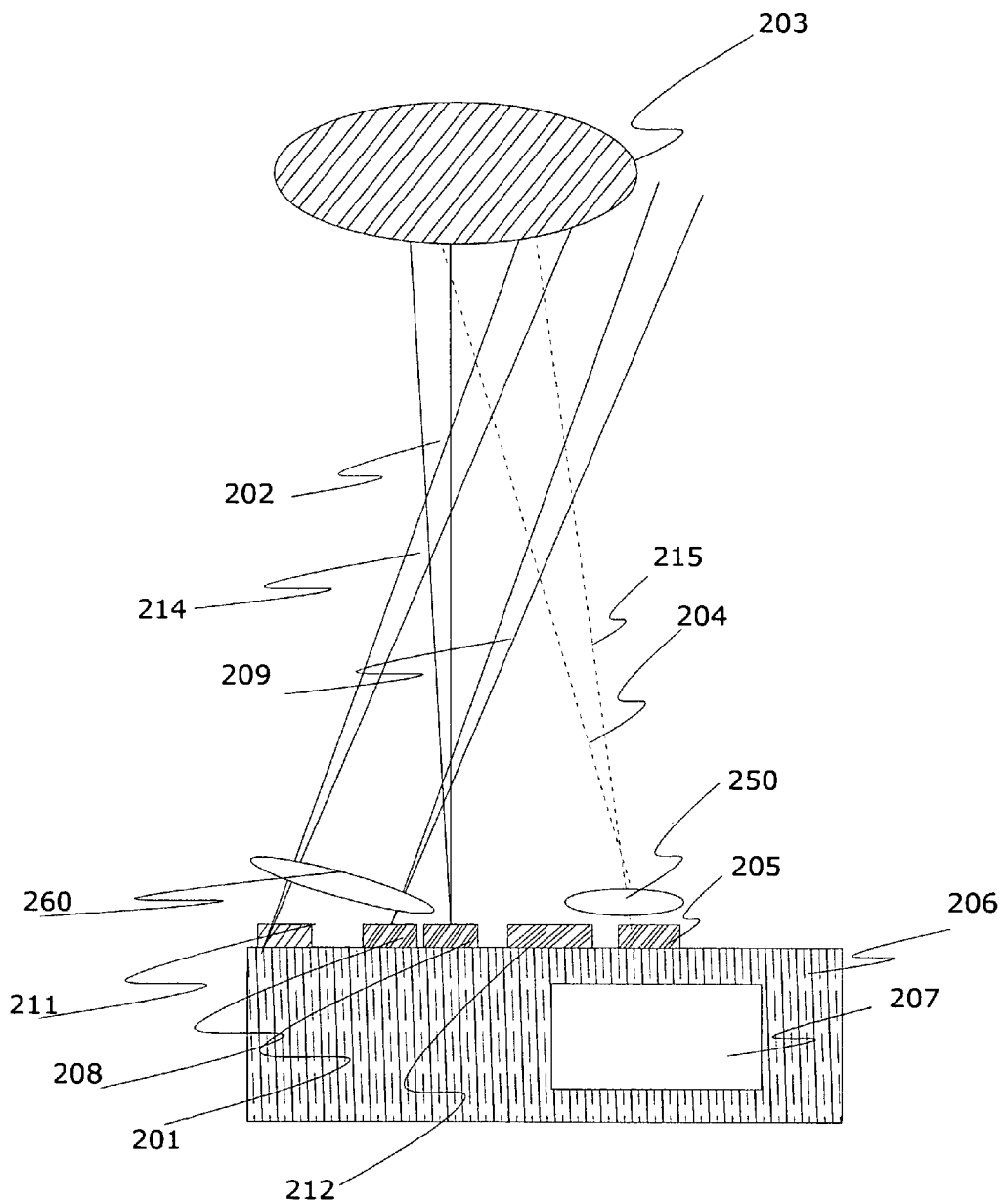
FIG. 2 illustrates another embodiment of the invention which includes one extra signal source

FIG. 2 illustrates an apparatus 206 according to the invention in which is connected one extra signal source 211. An advantage of the embodiment illustrated in FIG. 2 can be the fact that, by means of the embodiment, the distance of the object can be evaluated more accurately. Another advantage of the embodiment illustrated in FIG. 2 can be that the operational reliability of the device can be improved. First, the apparatus is turned on by means of the switch. FIG. 2 illustrates the embodiment of the invention according to which a first signal source 201 transmits a first signal beam pulse 202 and, then, a second signal source 208 transmits a second signal beam pulse 209 and, finally, the extra signal source 211 transmits a third signal beam pulse 214.

In an embodiment of the invention, several signal sources can also transmit beam pulses simultaneously such that the beam pulses alternate in terms of time in relation to at least one of the following: the first beam pulse, the second beam pulse and the third beam pulse. In another embodiment of the invention, the signal sources are again arranged to transmit beam pulses simultaneously but on a different frequency. In the embodiment of the invention shown in FIG. 2, the propagation paths of the first and the second beam pulse intersect in relation to each other. FIG. 2 shows that the propagation paths of the first and the extra signal source also intersect in relation to each other.

FIG. 2 illustrates an embodiment of the invention in which a lens 260 is set into connection with the signal sources 211 and 208. Also into connection with the receiver is installed a lens 250. It should be noticed that, in a further embodiment of the invention, it is possible to replace the lenses with some other optical element, such as e.g. a prism or a mirror.

FIG. 2 illustrates an embodiment of the invention in which the lens 260 controls the orientation of the beam pulses. In another embodiment of the invention, the lens could e.g. be arranged into connection with only one signal source, but it can be arranged into connection with several signal sources. Into connection with one signal source, several lenses can also be arranged. The lenses can be arranged to scatter or focus the beam pulses. FIG. 2 illustrates the second lens 250 which is in an embodiment of the invention arranged to focus the reflected parts of the beam pulses. In another embodiment of the invention, the lens 250 could operate in an equivalent way to the above lens 260. The shape of the lenses is not limited. There is no need for the lenses to be of the same shape but it is not limited. The shape of the lens can be e.g. convex or concave.

In an embodiment of the invention illustrated in FIG. 2, an object 203 is on the propagation path 202 of the first beam pulse and on the propagation path 214 of the extra beam pulse and, due to this, at least parts of the beam pulses are reflected from the object. A receiver 205 receives the reflected parts of first 204 and extra 215 beam pulses. After the reflected parts of the beam pulse have been received, they are digitalised by means of the processor A/D converter located on the circuit board 206. An SPU (signal processing unit) 207 compares the power level 204 of the reflected parts of the first beam pulse to the power level 215 of the reflected parts of the extra beam pulse by calculating their proportion. The values of said comparison to the values saved in the memory of the apparatus 206 and, if the values of the comparison are great enough, the object 203 can be detected. As a result of having detected the object 203, the processor performs predetermined operations.

Figure 3:
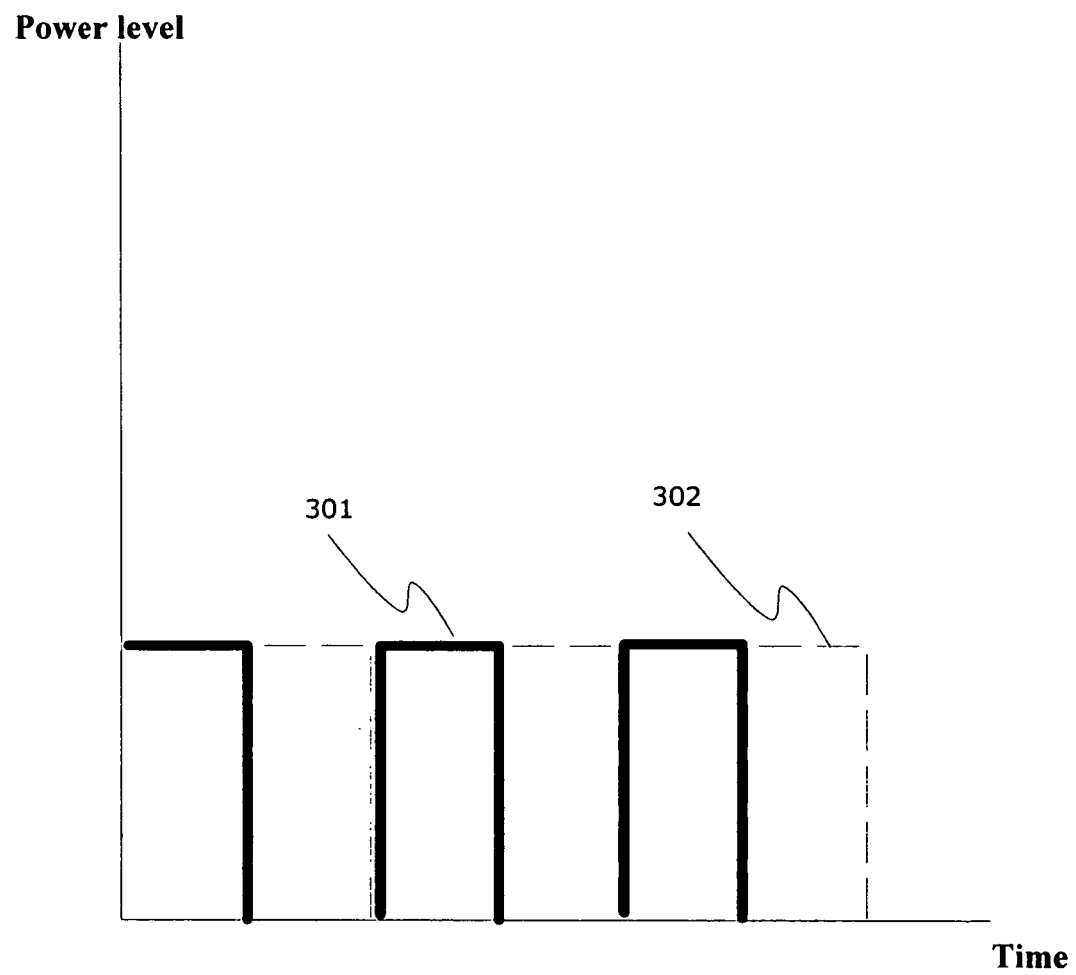
FIG. 3 illustrates an example of the power level of beam pulses of an embodiment according to the invention

FIG. 3 illustrates another example in which power 301 of the first signal source and power 302 of the second signal source are shown on the horizontal Y axis and these are shown as a function of time shown on the vertical X axis. In this embodiment of the invention shown in FIG. 3, the first signal source generates beam pulses successive in terms of time and the second signal source generates beam pulses successive in terms of time. In a special embodiment of the invention in FIG. 3, the first and the second signal source generate signals which form otherwise similar graphs except for these graphs have a phase difference in relation to time. In another embodiment of the invention, the graphs can differ from each other also otherwise than in relation to time difference. It should be noticed that in an embodiment of the invention there is no phase difference in relation to time at all. The signals of the first signal source can e.g. have a different wavelength or amplitude in relation to the signals of the second signal source.

Figure 4:
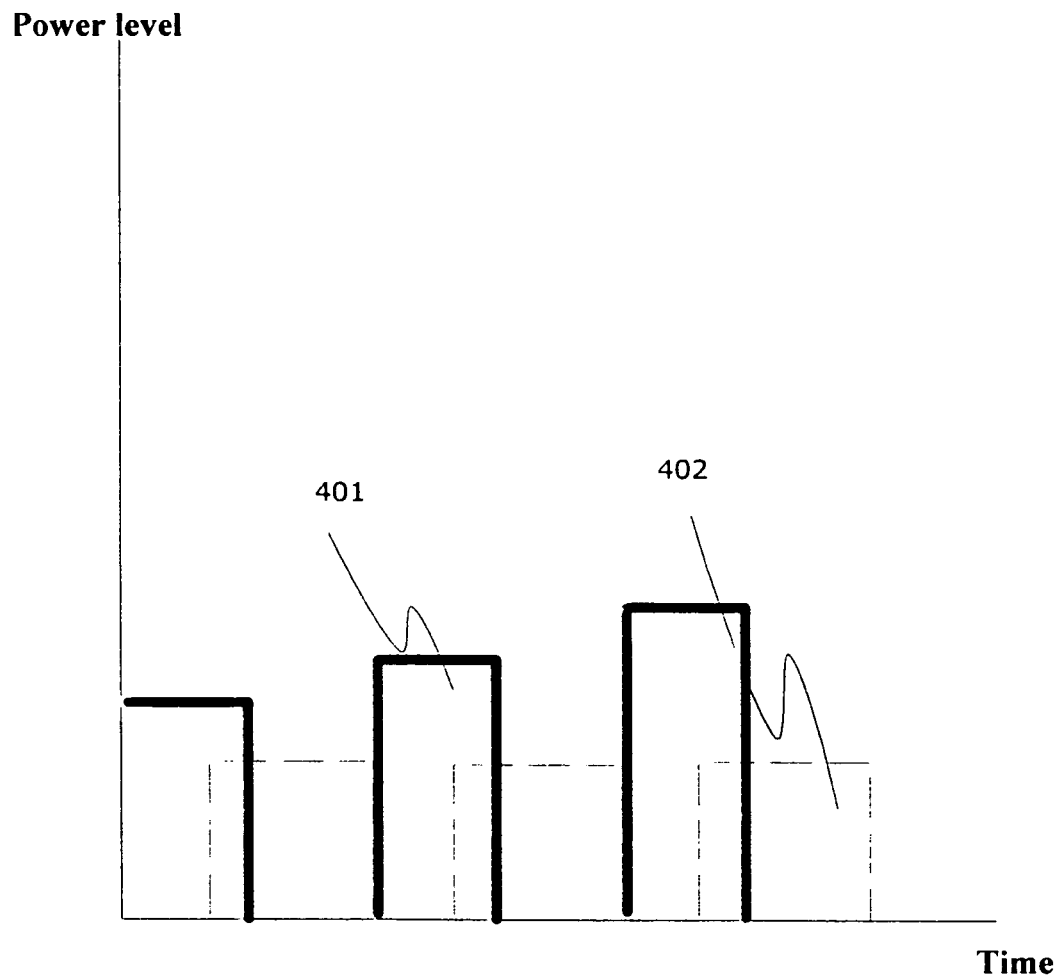
FIG. 4 illustrates another example of the power level of beam pulses of an embodiment according to the invention

FIG. 4 shows another embodiment of the invention in which power 401 of the first signal source and power 402 of the second signal source are shown on the horizontal Y axis and these are shown as a function of time shown on the vertical X axis. In the embodiment of the invention shown in the figure, the beam pulses generated by the first signal source have a different amplitude height than the beam pulses generated by the second signal source. FIG. 4 also illustrates that the signals are partially simultaneous and partially not simultaneous in relation to each other.

Figure 5:
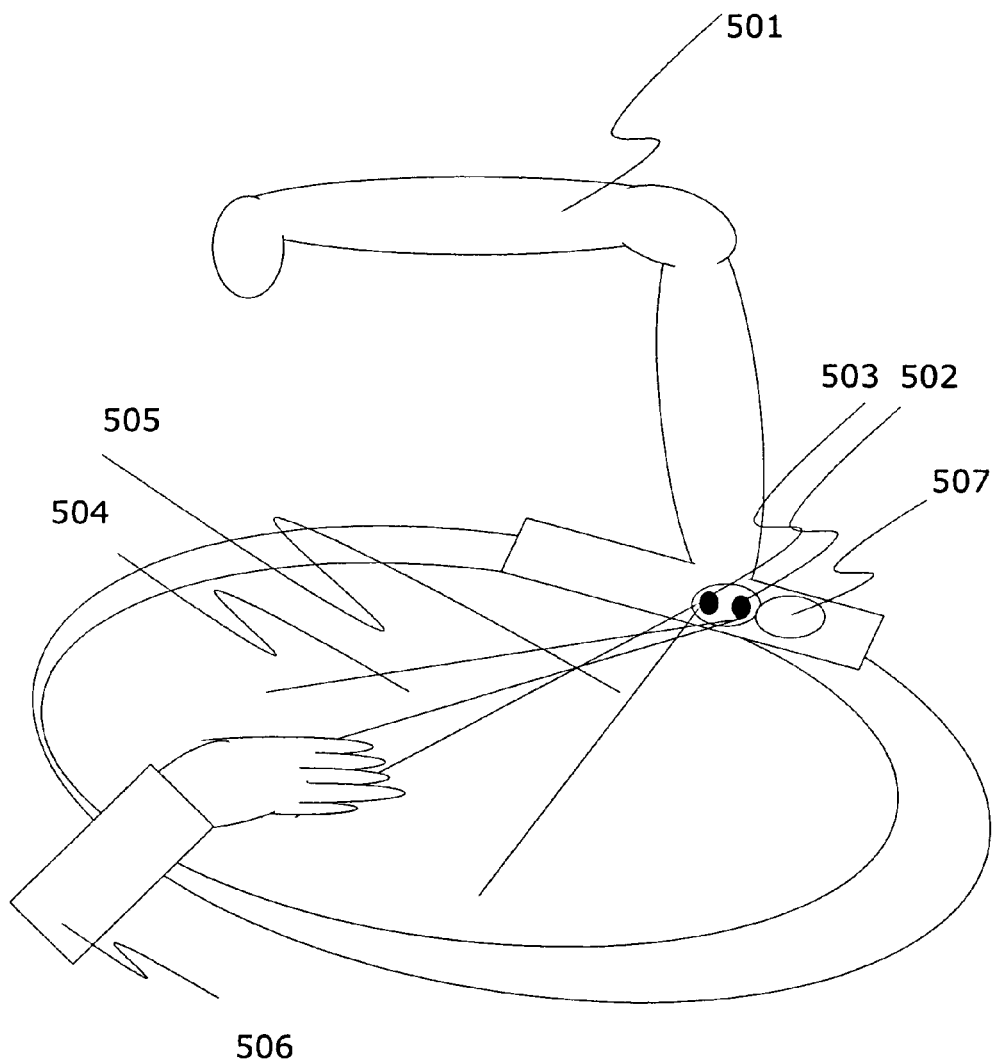
FIG. 5 illustrates an embodiment according to the invention of a water dispenser device which includes an apparatus according to the invention

FIG. 5 illustrates an embodiment of the invention in which a water dispenser device 501 or equivalent includes an apparatus according to the invention. In an embodiment of the invention, the "water dispenser device" is a tap, a water-pipe tap, a shower, a toilet seat or any other equivalent apparatus.

In an embodiment of the invention, the apparatus can operate e.g. equivalently as the apparatus shown in connection with FIG. 1. References 502 and 503 refer to signal sources which transmit signal beams 504 and 505 alternating in terms of time in relation to each other. FIG. 5 shows also an object 506 which is located on the propagation path of the first and the second signal beam. At least parts of the first and the second signal pulse are reflected as a result of the beams meeting the object 506 and they are received by a receiver 507. The object 501 is detected equivalently as in the embodiment shown in connection with FIG. 1. As a result of this, the water dispenser device 501 is turned on according to the above examples.

Figure 6:
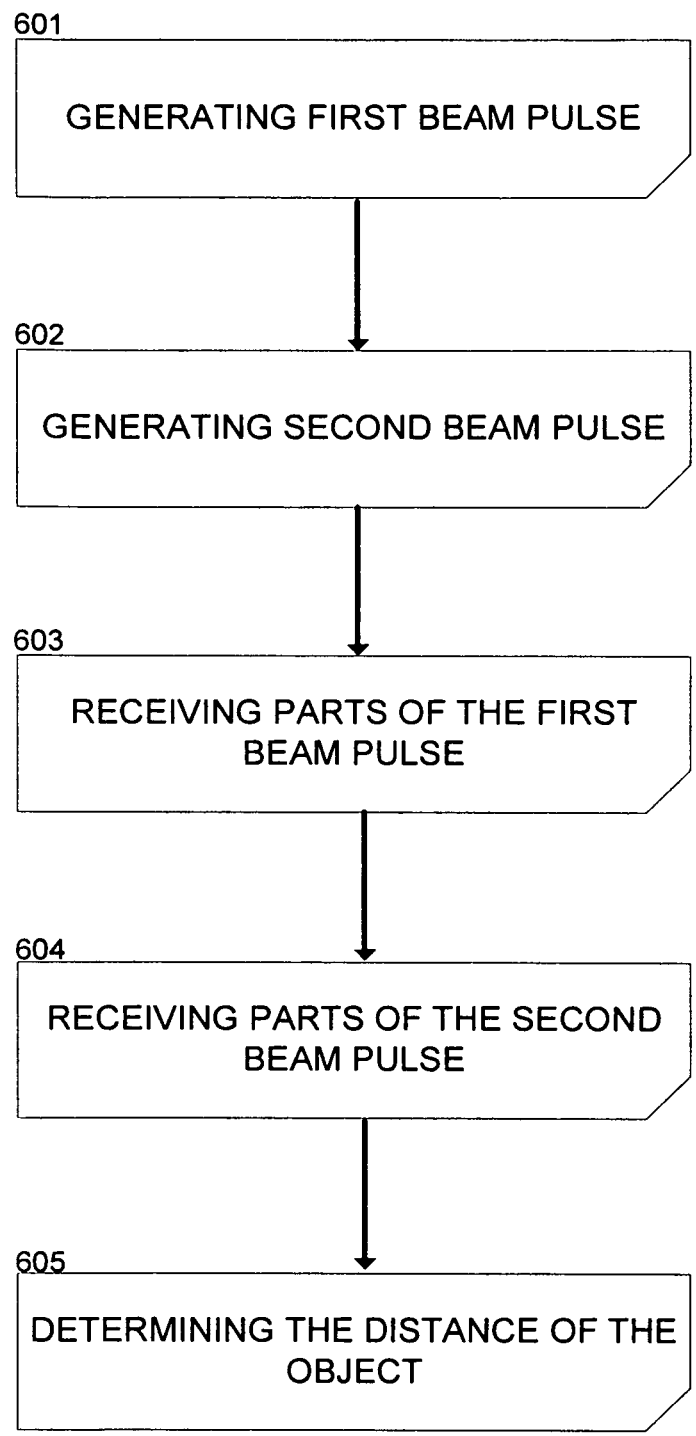
FIG. 6 illustrates an embodiment according to the invention of a method according to the invention.

FIG. 6 shows a method according to the invention which includes generating a first beam pulse 601 and generating a second beam pulse 602. The first beam pulse and the second beam pulse are alternating in terms of time in relation to each other and the propagation paths of the first beam pulse and the second beam pulse intersect in relation to each other.

The method also includes receiving reflected parts of a first beam pulse 603 and receiving reflected parts of a second beam pulse 604. The reflected parts of the first and the second beam pulse are reflected from an object which is located on the propagation path of the first and the second beam pulse. The method also includes determining the distance of the object 605. In the method, determining the distance of the object is based on at least one of the following: time difference between the reflected parts of the first pulse and the reflected parts of the second pulse and proportion of the power of the reflected parts of the first pulse to the power of the reflected parts of the second pulse.

In a method according to the invention, at least one extra beam pulse is generated the propagation path of which intersects at least with the propagation path of the first beam pulse. In a method according to the invention, extra beam pulses generated are periodic in terms of time.

An embodiment of the invention includes a computer program which contains computer program means by which the steps of the method shown in FIG. 6 or any other method according to the invention can be implemented when the program is run in a computer. In various embodiments of the invention, the computer program can be a computer program as such or a computer program product. The computer program product is an example of a physical object. It can be e.g. a data carrier such as a disk, a hard disk, an optical data carrier, a CD-ROM, a diskette, or an equivalent memory etc. In another example, the product can be in the form of a signal, such as an electromagnetic signal. The signal can be transferred e.g. along an electric wire. The product includes a computer program algorithm or computer program algorithm means which are arranged to perform different embodiments according to the invention. Furthermore, the invention can be concretised as a chip board or equivalent in an embodiment.

IMPLICATIONS AND SCOPE

Although the above description includes many specifications, they are primarily intended to depict the invention and should not be considered limitations of the scope of the invention. It should also be noticed that many specifications can be combined in various ways in one or more embodiments. Thus, it is evident to those skilled in the art that several different alterations and modifications can be performed on the apparatus and processes of the present invention without deviating from the spirit or scope of the invention.

The invention claimed is:

1. An apparatus for dispensing liquid, which apparatus is arranged to detect an object and to control the dispensing of said liquid, said apparatus including:
   a first signal source which is arranged to generate a first beam pulse and a second signal source which is arranged to generate a second beam pulse wherein said first and second beam pulses are so oriented in relation to each other that the propagation paths of said beam pulses cross each other,
   a receiver which is arranged to receive reflected parts of said first beam pulse and which is arranged to receive reflected parts of said second beam pulse, the parts reflected from said first and second beam pulses being reflected from said object which is located on the propagation path of the first and the second beam pulse, and
   a signal processing unit which is arranged to detect said object based on the parts reflected from said beam pulses received by said receiver and, based on this detection, arranged to control the dispensing of liquid, wherein the apparatus further includes that said first beam pulse and said second beam pulse are alternating in terms of time in relation to each other and wherein said signal processing unit is arranged to detect said object based on calculating proportion of a power level of the reflected parts of the first pulse to a power level of the reflected parts of the second pulse.

2. An apparatus according to claim 1, wherein said signal processing unit is arranged to detect said object based on time difference between the reflected parts of the first pulse and the reflected parts of the second pulse.

3. An apparatus according to claim 1, wherein the apparatus further includes at least one extra signal source which is arranged to generate an extra beam pulse the propagation path of which intersects with the propagation path of at least the first beam pulse.

4. An apparatus according to claim 3, wherein said extra beam pulse is periodic in terms of time.

5. An apparatus according to claim 1, wherein at least one of said signal sources is an infrared light emitting diode.

6. An apparatus according to claim 1, wherein said receiver is a photodiode or a phototransistor.

7. An apparatus according to claim 1, wherein said apparatus further includes at least one optical element which is arranged to orient the beam pulse.

8. A water dispenser device arranged to detect an object and to control dispensing of water, said device including: a first signal source which is arranged to generate a first beam pulse and a second signal source which is arranged to generate a second beam pulse wherein said first and second beam pulses are so oriented in relation to each other that the propagation paths of said beam pulses cross each other; a receiver which is arranged to receive reflected parts of said first beam pulse and which is arranged to receive reflected parts of said second beam pulse, the parts reflected from said first and second beam pulses being reflected from said object which is located on the propagation path of the first and the second beam pulse, and a signal processing unit which is arranged to detect said object based on the parts reflected from said beam pulses received by said receiver and, based on the detection, arranged to control the dispensing of water, wherein the device further includes that said first beam pulse and said second beam pulse are alternating in terms of time in relation to each other and wherein said signal processing unit is arranged to detect said object based on calculating proportion of a power level of the reflected parts of the first pulse to a power level of the reflected parts of the second pulse.

9. A method for dispensing liquid, which includes detecting an object and controlling the dispensing of said liquid, and further including:

generating a first beam pulse and generating a second beam pulse wherein said first and second beam pulses are so oriented in relation to each other that the propagation paths of said beam pulses cross each other, receiving reflected parts of said first beam pulse and reflected parts of said second beam pulse, the parts reflected from said first and second beam pulses being reflected from said object which is located on the propagation path of the first and the second beam pulse, and detecting said object based on the parts reflected from said beam pulses received and, based on this detection, controlling the dispensing of liquid, wherein said method further includes that said first beam pulse and said second beam pulse are alternating in terms of time in relation to each other and wherein a signal processing unit is arranged to detect said object based on calculating proportion of a power level of the reflected parts of the first pulse to a power level of the reflected parts of the second pulse.

10. A method according to claim 9, wherein the detection of said object is based on time difference between the reflected parts of the first pulse and the reflected parts of the second pulse.

11. A method according to claim 9, wherein said method, further generating an extra beam pulse the propagation path of which intersects with the propagation path of at least the first beam pulse.

12. A method according to claim 11, wherein said extra beam pulse is periodic in terms of time.

13. A computer program embodied in a non-transitory computer readable medium, the computer program includes instructions to control a computer to perform the method of claim 9 when said computer program is executed by the computer.

14. An apparatus according to claim 1, wherein the apparatus further includes that the beam pulses generated by said signal sources are periodic in terms of time.

* * * * *